A. L. McKINNEY & L. H. ZEIGLER.
SHUTTER OPERATOR FOR CAMERAS.
APPLICATION FILED SEPT. 1, 1910. RENEWED APR. 11, 1914.

1,108,458.

Patented Aug. 25, 1914.
8 SHEETS—SHEET 1.

Witnesses
Jos. H. Blackwood
Mamie B. Hardell

Inventors
Arthur L. McKinney
Lyman H. Zeigler
By James K. Polk
Attorney

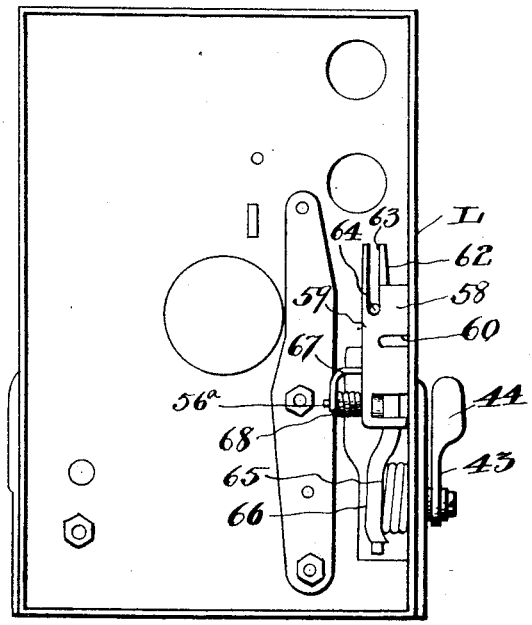
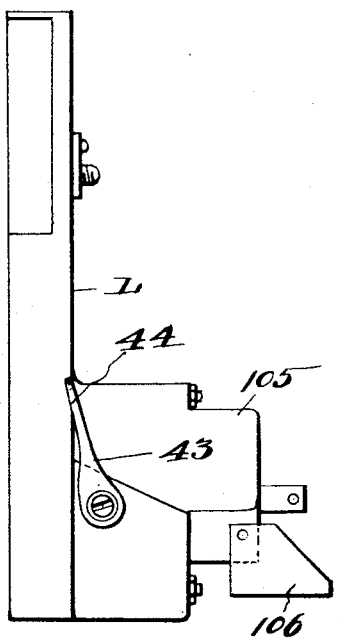
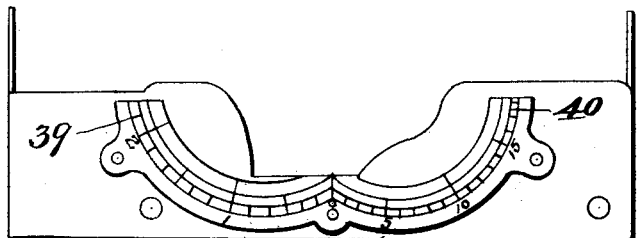
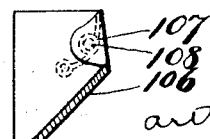

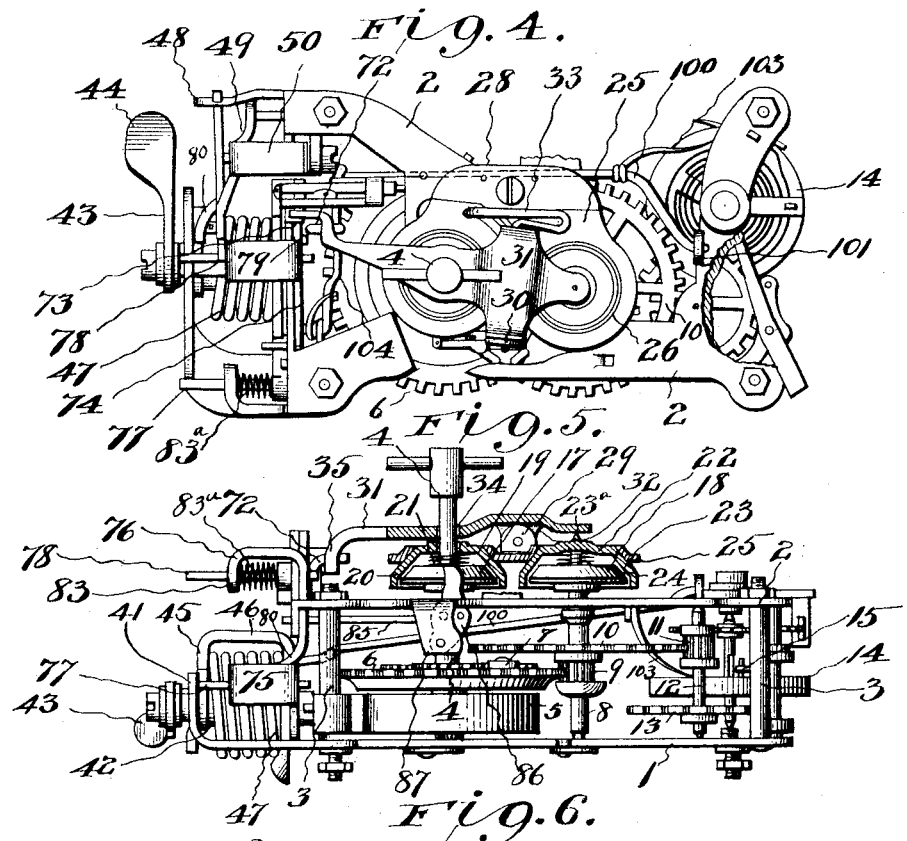

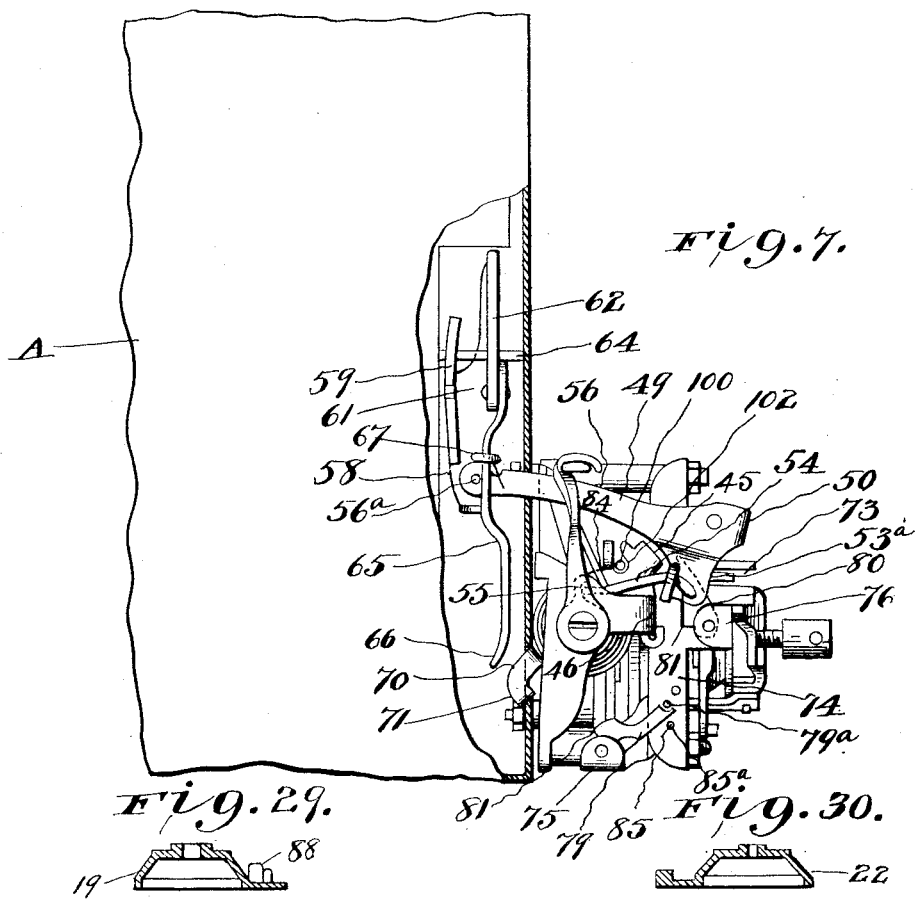

A. L. McKINNEY & L. H. ZEIGLER.
SHUTTER OPERATOR FOR CAMERAS.
APPLICATION FILED SEPT. 1, 1910. RENEWED APR. 11, 1914.
1,108,458.
Patented Aug. 25, 1914.
8 SHEETS—SHEET 5.
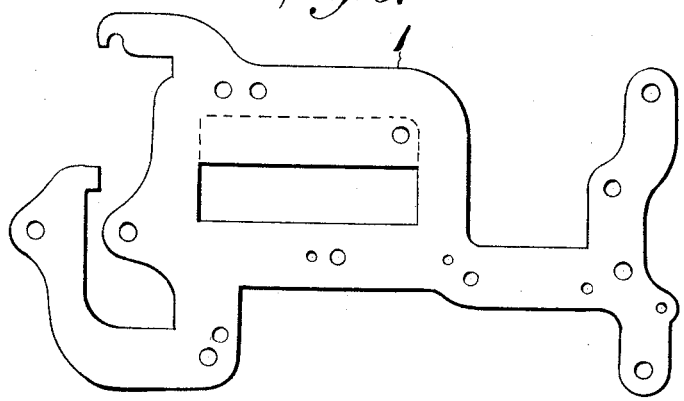
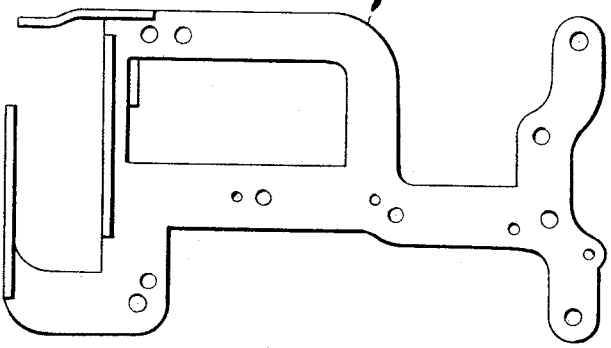
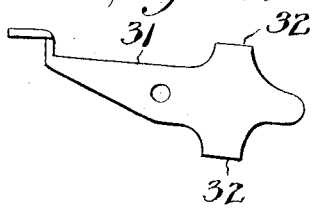
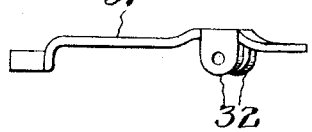

A. L. McKINNEY & L. H. ZEIGLER.
SHUTTER OPERATOR FOR CAMERAS.
APPLICATION FILED SEPT. 1, 1910. RENEWED APR. 11, 1914.

1,108,458.

Patented Aug. 25, 1914.
8 SHEETS—SHEET 6.

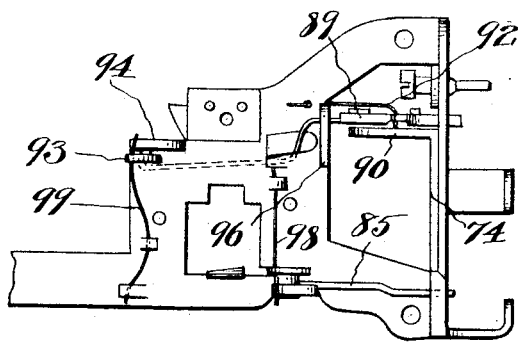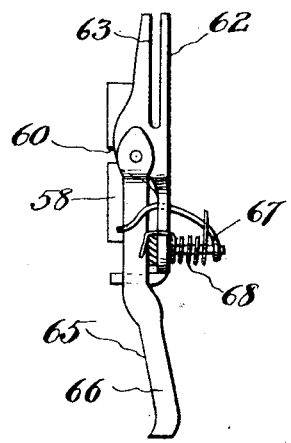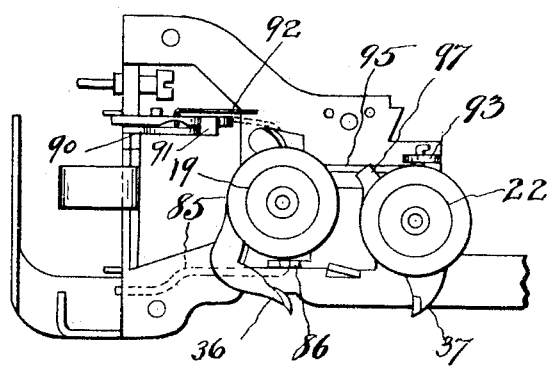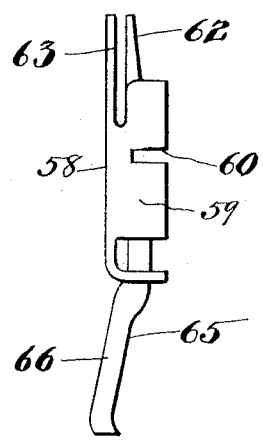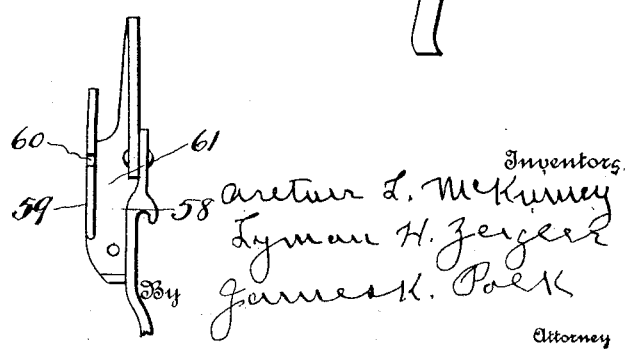

A. L. McKINNEY & L. H. ZEIGLER.
SHUTTER OPERATOR FOR CAMERAS.
APPLICATION FILED SEPT. 1, 1910. RENEWED APR. 11, 1914.
1,108,458.
Patented Aug. 25, 1914.
8 SHEETS—SHEET 8.
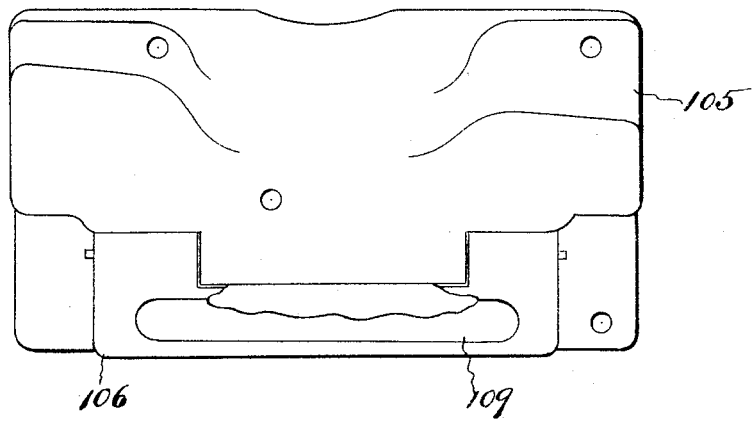
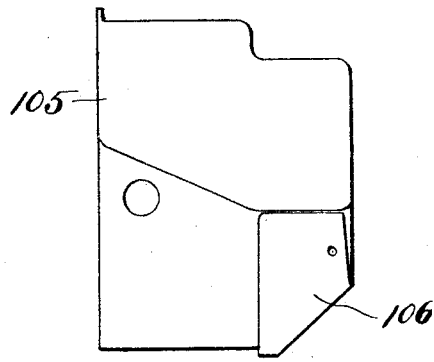
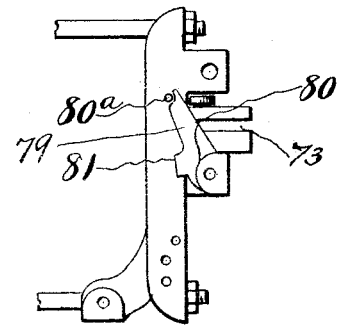
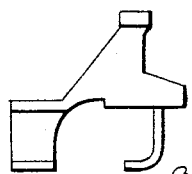

UNITED STATES PATENT OFFICE.

ARTHUR L. McKINNEY AND LYMAN H. ZEIGLER, OF REDKEY, INDIANA.

SHUTTER-OPERATOR FOR CAMERAS.

1,108,458. Specification of Letters Patent. Patented Aug. 25, 1914.

Application filed September 1, 1910, Serial No. 580,045. Renewed April 11, 1914. Serial No. 831,279.

*To all whom it may concern:*

Be it known that we, ARTHUR L. MCKINNEY and LYMAN H. ZEIGLER, citizens of the United States, and residents of Redkey, in the county of Jay and State of Indiana, have invented certain new and useful Improvements in Shutter-Operators for Cameras, of which the following is a specification.

Our invention relates to devices for operating the rotary shutter-disks of the "kodak" type of cameras, and has for its object the provision of a mechanism that is capable of being set for future exposure of the plate to enable the photographer to focus and place his camera and then step in front of it so as to take a picture of himself. The device is also constructed so that the future exposure may be a "snap shot" or a "time" exposure, depending upon the actinic value of the light.

Our invention will be described in detail hereinafter and illustrated in the accompanying drawings, in which—

Figure 1:
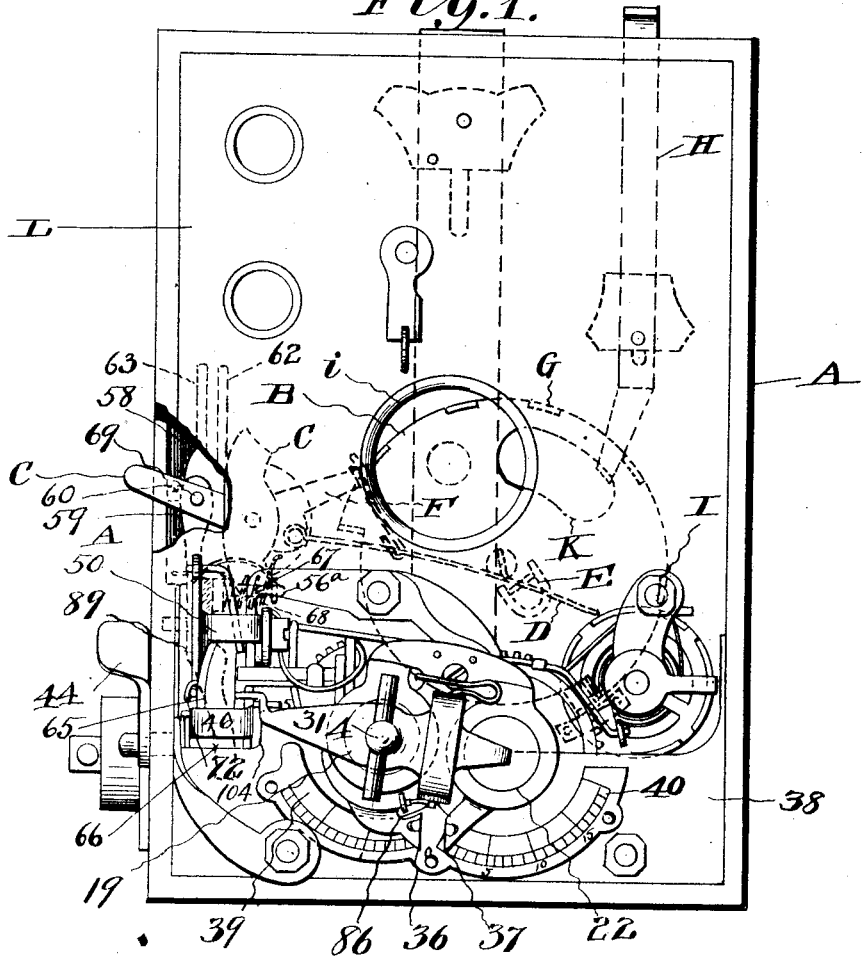
Figure 15:
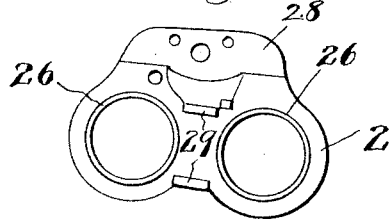
Figure 16:
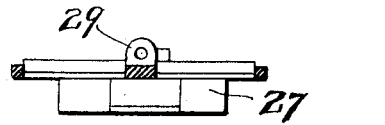
Figure 10:
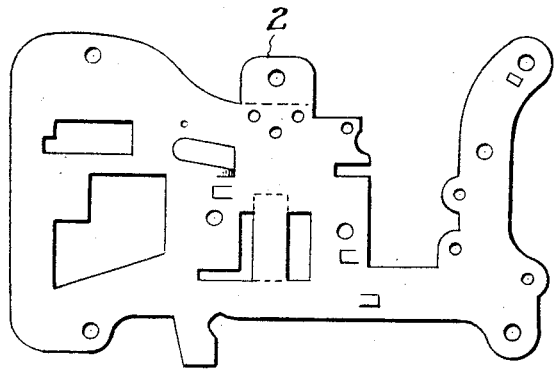
Figure 11:
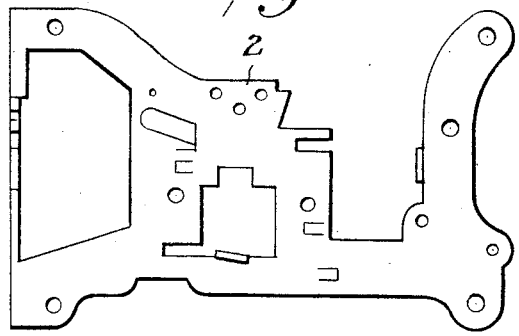
Figure 12:
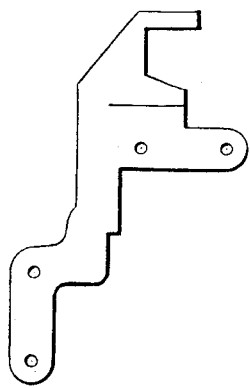
Figure 13:
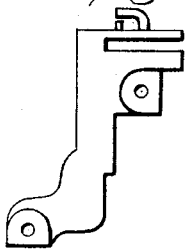

Figure 1 is a front view of a camera, partly broken away, showing our shutter-operating device secured thereto; Fig. 2, a fragmental view, partly in section, of the side of a camera, showing the shutter-operator in position; Fig. 3, a view of the inner side of the front plate of the camera with the operating mechanism in position; Fig. 4, a front elevation of the mechanism on an enlarged scale with the inclosing casing removed; Fig. 5, a bottom plan view of the mechanism shown in Fig. 4; Fig. 6, a top plan view, some of the parts being omitted for greater distinctness; Fig. 7, a side view showing the lever-actuating shoe in place; Fig. 8, a view of the blank from which the base-plate is shaped; Fig. 9, the blank shown in Fig. 8 after being shaped; Fig. 10, a view of the blank from which the top plate is shaped; Fig. 11, the blank shown in Fig. 10 after being shaped; Fig. 12, a view of the blank from which the pawl-supporting plate is shaped; Fig. 13, a side view of the blank shown in Fig. 12 after being shaped; Fig. 14, an end view of the same blank shaped; Figs. 15 and 16, a plan view and elevation, respectively, of the cup-guide plate; Fig. 17, a fragmental view of the front of the operating mechanism with some of the parts omitted; Fig. 18, a rear view of the same parts shown in Fig. 17; Fig. 19, an end view of the same parts; Figs. 20 and 21, front and side views of the inclosing casing for the mechanism; Fig. 22, a fragmental sectional view of the casing showing the spring to hold the lid in its closed position; Figs. 23 and 24, plan and side views of cup actuating lever; Fig. 25, a view in elevation of the container casing; Figs. 26, 27, and 28, detail views of the operating shoe and its connected parts; Figs. 29 and 30, sectional views of the inverted cups; Figs. 31, and 32, detail views of the main and counter shafts, respectively, and their connected parts, shown partly in section; and Fig. 33, a detail of the pawl that controls the operation of the lens shutter.

In the drawings similar reference characters indicate corresponding parts throughout all of the views.

A indicates a camera which for the purpose of the device, as shown in the drawings, consists of the type of camera manufactured by the Eastman Kodak Company, of Rochester, N. Y., and known as the "No. 2A Brownie," though with but slight alterations, if any, it is adapted for use with other styles of cameras employing rotary shutters, and we do not therefore limit ourselves to the style of camera illustrated and described nor to the construction shown and described except where specifically claimed hereinafter.

As stated, the camera to which our device is adapted is the type employing a rotary shutter B, operated by a finger-piece lever C and spring-arm D, secured to the lever and slidably engaging a perforated ear E on the shutter, the lever C having an escapement arm F that engages the outstanding lugs G on the edge of the shutter B.

H designates the slidable rod that controls the operation of the shutter when used ordinarily, engaging the lug I on the edge of the shutter when set for time exposure to stop the shutter, so that the exposure-opening K is opposite the lens until moved by the lever C. This construction is familiar to operators of cameras and is described, not because it is a part of our invention, but because in use with our device the shutter has to be set for time exposure when the exposure-opening K is at the right-hand side of the lens, so that the lever C must be moved downwardly first and then upwardly to complete the exposure and closure of the lens-opening.

The front plate L of the camera A has our improved shutter-operator secured thereto, which we will now proceed to describe. The operating device is secured below the light-opening device *i* on plate L and is mounted on two plates, of which the plate 1 is the base plate and is shown as a blank in Fig. 8 and, after being shaped, in Fig. 9, while in Fig. 10 is shown the top plate 2 as a blank, and in Fig. 11 after being shaped, said plates being secured together by studs or bolts 3. Our improved shutter-operator is operated by a suitable spring motor consisting of a main shaft 4, journaled in plates 1 and 2, and rotated by a convolute spring 5, secured to the shaft and to one of the studs or bolts 3, the shaft having a gear-wheel 6 mounted thereon and connected therewith by means of a pawl and ratchet mechanism 7.

8 indicates a counter-shaft journaled in plates 1 and 2 and having a lantern pinion 9 secured thereto and meshing with gear-wheel 6, and a gear-wheel 10 that meshes with lantern-pinion 11, secured to escapement-shaft 12.

13 indicates the escapement-wheel, 14 the balance-wheel, and 15 the balance-lever, an escapement-arm (not shown) being also provided that engages the escapement-wheel 13 in the usual manner. This construction of spring-motor is substantially the same as the motor employed in spring-actuated clock-works, and its operation is for that reason familiar to persons skilled in the art. The spring-motor is employed to regulate the operation of the shutter-actuating mechanism to time the opening of the shutter in the future and also to time the length of exposure from instantaneous to any reasonable time exposure, and the construction by which this is accomplished will now be described. Secured to each of the shafts 4 and 8 are beveled disks 17 and 18, respectively, and slidably mounted on the shaft 4 is an inverted cup 19, having inclined sides 20, adapted to frictionally engage the beveled edge of disk 17, but held from engagement therewith by means of coil-spring 21.

22 indicates an inverted cup with inclined sides 23 in front of disk 18 and held from engagement therewith by means of coil-spring 24 shown in Figs. 5 and 32.

25 indicates a plate having holes 26 therein to receive cups 19 and 22 and having a horizontal flange 27 with vertical foot portion 28 secured to top plate 2.

29 indicates ears on plate 25, as shown in Figs. 5, 15, and 16, and 30 an ear extending forwardly from plate 2.

31 indicates a lever having ears 32 extending rearwardly therefrom, and 33 a rod extended through holes in ears 29, 30 and 32 to serve as a journal for lever 31, said rod 33 being shown in Figs. 4, 5, and 6. One end of lever 31 bears against a pointed projection 23ª on the top of inverted cup 22, while at the opposite side of the journal the lever is formed with an aperture 34 to receive main shaft 4, the end of the lever being formed with an angular portion 35 that will be hereinafter referred to. Cup 19 is formed with a pointer 36 and cup 22 with a pointer 37, while the fixed casing 38 is formed with two segmental dials 39 and 40 formed on the casing 38, or on a plate secured thereto.

Dial 29 is marked to indicate minutes and dial 40 is marked to indicate seconds, and in operating the mechanism to be hereinafter described the pointer 36 is set to indicate the number of minutes that are to elapse before the exposure of the film or plate is to take place to give the operator time to get out in front of the camera, while the pointer 37 is set to indicate the length of the exposure, that is, if it is to be a snap-shot the pointer is not moved, while if it is to be a time exposure the pointer is moved to the position indicating the length of the exposure desired. As neither of the cups 19 and 22 engage disks 17 or 18, it will be apparent that the cups may be moved as desired prior to setting the device for operation, and then when the mechanism to be hereinafter described is set for operation the lever 31 is moved by said mechanism so that the cup 19 is depressed into engagement with disk 17 and causes the motor in its operation to rotate the cup and its pointer 36 with the shaft 4 until the pointer reaches zero. At this time the lever 31 is released from engaging cup 19, and cup 22 is engaged by said lever 31 and depressed so that said cup 22 engages disk 18 and the cup with its pointer 37 is rotated with the shaft 8, only one cup and pointer operating at a time. This operation of cups 19 and 22 and the pointers thereto attached being necessary to open the shutter at a predetermined future time and to close the shutter after the expiration of a predetermined interval, as will be more fully described hereinafter. Plate 1 is formed with bearings 41, in which is journaled a drum 42, said drum having operating-handle 43, secured to one of its trunnions, and is formed with a flat end 44 that serves as a signal to indicate when the exposure is completed. Secured to drum 42 is a lever 45, having one end formed with a U-shaped portion 46 that is also secured to the drum.

47 indicates a coil-spring wound on drum 42, having one end secured to hook 48 on plate 1, and the other end secured to the U shaped portion 46 of the lever 45, said spring normally tending to move the lever and drum so that the operating-arm 43 stands upwardly.

49 indicates a lever having an extended portion 50 bent back on itself and secured between ears 51 and 52, as shown in Fig. 6, the pivot-pin 53 being extended beyond the ear 52 and engaging the body of lever 49. The two arms of the lever 49 are of different lengths, the shorter arm 53ª being downwardly extending and is connected, as shown in Fig. 7, by rod 54, with an ear 55 on the U-shaped portion 46 of lever 45, while the longer arm 56 of lever 49 extends rearward from plate L, the rearmost end of the arm 56 having a laterally-extending pivot-pin 56ª thereon.

58 indicates a shoe having a tread-plate 59, with a transverse notch 60 therein, an upstanding web 61 and a guide-plate 62 extended on a plane substantially parallel with the tread-plate 59, said guide-plate having a longitudinal slot 63 therein that engages a pin 64 on the inner side of front plate L. These parts are best shown in Figs. 3, 7, 26, 27, and 28.

65 indicates a bar rigidly secured to shoe 58 and having its free end formed with a rearwardly-curved and laterally-inclined portion 66, said bar 65 being clearly shown in Figs. 7, 26, and 37. Shoe 58 is pivotally mounted on pivot-pin 56ª, 67 indicating a rod engaging bar 65 and formed with an eyelet to engage the end of pin 56ª.

68 indicates a coil-spring having one end engaging rod 67 and the other end engaging arm 56 and normally tending to move the shoe rearwardly into engagement with the finger-piece lever C, so that the notch 60 in its tread-plate 59 will engage pin 69 on said finger-piece lever. The rearmost end 70 of lever 45 engages the end 66 of bar 65 and is formed with a downwardly-extending and laterally-inclined edge portion 71, that engages the laterally-inclined edge of bar 65 when the end 70 of the lever swings upwardly. The purpose of this construction is to provide for moving the shoe 58 out of engagement with finger-piece lever C and pin 69 thereon when setting the device for automatic operation, the end 70 by engaging the curved side of the bar 65 serves to lift the shoe when the operating-arm 43 is swung downwardly, and lifts the shoe from engagement with the lever C, so that the shutter does not open when the device is being set, as opening the shutter would cause an exposure of the sensitive plate or film in the camera, but when the lever returns during the automatic operation of the device the inclined portion 71 engages the inclined edge of the lower end 66 of the bar 65 and does not move the shoe from engagement with the lever C.

72 indicates a rod connecting lever 45 and angular portion 35 of lever 31 to operate said lever 31, as hereinbefore described, so that it depresses cup 19 in the initial period of the operation of the spring-motor and the cup 22 in the final period, when a time exposure is being made, as hereinbefore stated.

The extreme end of lever 31 engages a vertical slot 73 in plate 74, shown in Figs. 7 and 19, secured to the edge of top plate 2, being guided thereby in its upward and downward movements, the walls of the slot preventing side thrust of the lever.

Plate 74 is formed with two elongated portions 75 and 76 that are formed U-shaped, as shown, and have pivot-pins 77 and 78 secured therein, on which are mounted pawls 79 and 80, shown in Figs. 4, 5, 7 and 19, the pawl 79 being positioned to engage the outer end of lever 45 when at the extremity of the setting movement of the device, while pawl 80 engages the lever at the point when the shutter B is moved to expose the lens-opening. Each pawl 79 and 80 is formed with a downwardly extending lug 81, shown in Fig. 7, and having a beveled edge 81ª, and a laterally-extending projection 82.

83 and 83ª indicate coil-springs mounted on the pins 77 and 78, respectively, with one end engaging the U-shaped portions 75 and 76, while their other ends engage pawls 79 and 80 to hold them normally in a lowered position, lugs or projections 79ª and 80ª being provided to limit the downward swing of the pawls.

The upper end of lever 45 is formed with a beveled portion 84, shown in Fig. 7, complementary to the beveled edges 81ª of projections 82, shown in Fig. 33, so that when the lever is swung downwardly in setting the device the pawls are pushed aside against the torsional resistance of springs 83 until the end of the lever has passed the lugs, when the pawls 79 and 80 resume their original position and engage the end of the lever.

Pawl 79 is normally held from movement away from the lug 79ª by means of a rod 85, Figs. 5, 7, 17 and 18, slidably mounted in a hole 85ª in plate 74, Fig. 7, said rod being secured to a dog 86, shown in Fig. 5 as pivotally secured to an ear 87, extending rearwardly from plate 2, the upper end of the dog being positioned to be engaged by a pin 88 on the cup 19, and when the pointer 36 thereon reaches zero in its operation, as hereinbefore described, the dog 86 will have been moved sufficiently to release rod 85 from engagement with pawl 79, and the lever 45 will be released from engagement therewith, the pawl being swung on pivot-pin 77 against the resistance of spring 83 by the pull exerted by the stronger spring 47 secured to lever 45.

If the device is set for a time exposure, the pawl 80 will intercept the lever 45 and hold it in position to hold the shutter open, said pawl being prevented from swinging away from its restraining lug 80ª by means of pawl 89, pivotally secured to an offset 90 on plate 74, the pawl being normally held in engagement with the free end of pawl 80 and a lateral inverted U-shaped extension 91 of the offset 90 by means of a bow-spring 92, secured at one end to plate 2, and with its other end engaging said pawl 89. The end of the pawl 89 that engages pawl 80 has its upper edge beveled, so that after the pawl 80 is swung upwardly to release the lever, as will be hereinafter described, the pawl 80 will resume its normal position by moving to one side against the torsional resistance of its retaining spring 83.

93 indicates a lever pivotally secured to ear 94, extending horizontally from plate 2, and 95 a rod secured to said lever and having its free end slidably mounted in ear 96, extending horizontally from plate 2, said end of the rod normally engaging pawl 89 to prevent it from swinging to release the pawl when the apparatus is set for time exposure.

97 indicates a projection on cup 22 that engages lever 93 when the pointer 37 reaches zero in its operation by the spring-motor, as hereinbefore described. These parts are illustrated in Figs. 17 and 18.

98 and 99 indicate springs secured to plate 2 and engaging levers 86 and 93 to hold said levers normally in position to move rods 85 and 95 in engagement with pawls 79 and 89.

100 indicates a rod pivotally secured at one end in ear 101 on plate 2, while its other end is positioned to engage a notch 102 in the end of lever 45, 103 indicating an arm secured to said rod 100 and so positioned that it engages the balance-wheel 14 when the free end of the rod is engaged by the notch 102 in lever 45 aforesaid, said rod being lifted when the lever is swung from engagement with it by means of a spring-arm 104 secured adjacent to said rod and to plate 102. These parts are shown in Figs. 1 and 4.

It will be understood from this construction that in setting the device for operation for time exposure, as hereinbefore described, the operating-arm 43 is moved downwardly, as stated, thus rotating drum 43 and with it lever 45 to set the shoe 58, as hereinbefore specifically described. During this operation the end of the lever 45 passes pawls 79 and 80 by pushing them aside against the resistance of coil-springs 83, as stated hereinbefore, and the lever comes to rest engaging pawl 79. At the same time the arm 103 is released from engagement with balance-wheel 14 by the notch 102 in lever 45 being removed from engaging end of rod 100, and said rod being raised by spring-arm 104, so that the operation of the spring-motor is started. As the lever 31 is rocked by this operation so that it engages the top of cup 19 and no pressure is exerted on cup 22, it will be apparent that the cup 19 and its pointer 36 are rotated with the main shaft 4 until the pointer reaches zero, when the dog 86, Fig. 17, will reach the position to release rod 85 from engagement with pawl 89, and the lever 45 will be released to the action of spring 47 and drum 42. The lever 45 and operating-arm 43 will thereupon rotate until the end of the lever engages the pawl 80. This operation of lever 45 will swing the bell-crank lever 49 so that its longer rear arm 56 will swing down and with it move shoe 58 and finger-lever C to open the shutter B. Also, the angular portion 35 of lever 31 will be raised so that it is released from engaging cup 19, and cup 22 is engaged and moved rearwardly so that it engages disk 18, and the cup 22 and pointer 37 rotates with shaft 8 until the pointer reaches zero. When the pointer reaches zero, the projection 97 engages lever 93 and moves it so that rod 95 disengages pawl 89 and the lever 45, drum 42 and operating-arm 43 are again released to the action of spring 47. This final movement of the lever 45 moves the bell-crank lever 49 so that its rear end is raised and with it shoe 58 and finger-lever C to close shutter B. During the final movement of lever 45, notch 102 again engages the free end of rod 100 and arm 103 engages balance-wheel 14 to stop it and the spring-motor.

When the device is set for a snap-shot at a future time, as hereinbefore described, the lever 45, drum 42, and operating arm 43 make a complete operation at one stroke, thus opening and closing the shutter B momentarily instead of periodically opening and closing the shutter, as above described.

105 indicates a hood over the top of the operating mechanism, 106 a lid hinged thereto and held normally in a lowered position by means of spring 107, engaging pintle 108, and 109 a sight opening in the front of the lid 106 to enable the operator to see the pointers 36 and 37 when they approach zero.

Having thus described our invention, what we claim is—

1. In combination with a camera having a lever-actuated shutter, a shoe detachably engaging the lever, a bell-crank lever pivotally secured to said shoe to actuate it and the shutter-lever, a spring-actuated lever operatively secured to the bell-crank lever and engaging the shoe to release the shoe from the shutter-lever, in moving the lever against the resistance of its actuating spring, pawls positioned to engage the lever and hold it against the pull of its actuating spring, one of said pawls holding the lever in the position to open the shutter when released, the other pawl positioned to hold the lever when the shutter is open, and means to release said pawls at predetermined intervals of time, substantially as shown and described.

2. In combination with a camera having a lever-operated shutter, a shoe detachably engaging the lever, a bell-crank lever pivotally secured to said shoe to actuate it and the shutter-lever, a spring-actuated lever operatively secured to the bell-crank lever and engaging the shoe to release the shoe from the shutter-lever, in moving the lever against the resistance of its actuating spring, pawls positioned to engage the lever and hold it against the pull of its actuating spring, one of said pawls holding the lever in the position to open the shutter when released, the other pawl positioned to hold the lever when the shutter is open, a spring-motor comprising a main shaft and a driven shaft, mechanism operatively secured to the main shaft to release the first-mentioned pawl, and means operatively secured to the driven shaft to release the last-mentioned pawl, substantially as shown and described.

3. In combination with a camera having a lever-actuated shutter, mechanism for actuating the said lever controlled by releasable holding means, a spring-motor comprising a main shaft and a driven shaft, a disk secured to each shaft, a cup loosely mounted on each shaft and adapted to frictionally engage the disk thereon, means operated by said cups to release said holding means, and a lever actuated by the shutter-actuating mechanism to severally move the cups into engagement with the aforesaid disks, substantially as shown and described.

4. In combination with a camera having a lever-actuated shutter, mechanism for actuating said shutter-lever, pawls positioned to engage the actuating mechanism and hold it from operation, one of said pawls positioned to hold the mechanism from moving the shutter, the other pawl positioned to hold the mechanism inactive with the shutter open, rods engaging said pawls to hold them in position to prevent operation of the shutter-actuating mechanism, dogs secured to said rods, a spring-motor comprising a main shaft and a driven shaft, disks secured to said shafts, a cup loosely mounted on each shaft and adapted to engage the disk thereon, said cups formed to engage said dogs to move the rods from engaging the pawls, and a lever actuated by the shutter-operating mechanism to severally move the cups into engagement with the disks to cause them to rotate with the motor-shafts, substantially as shown and described.

5. In combination with a camera having a lever-actuated shutter, a shoe detachably engaging the lever, a bell-crank lever pivotally secured to said shoe, to actuate it and the shutter-lever, a spring-actuated lever operatively secured to the bell-crank lever and engaging the shoe to release the shoe from the shutter-lever in moving the lever against the resistance of its actuating spring, pawls positioned to engage the lever and hold it against the pull of its actuating spring, one of said pawls holding the lever in the position to open the shutter when released, the other pawl positioned to hold the lever when the shutter is open, rods engaging said pawls to hold them in position to prevent operation of the spring-actuated lever, dogs secured to said rods, a spring-motor comprising a main shaft, a driven shaft, and a balance-wheel, a spring-rod having an arm to engage the balance-wheel at times, said rod engaging the spring-actuated lever at the completion of its operating movement to stop the movement of the motor, disks secured to the motor-shafts, a cup loosely mounted on each shaft and adapted to engage the disk thereon, said cups having projections to severally engage the dogs aforesaid, a lever actuated by the spring-actuated lever and positioned to severally engage the cups aforesaid and move them into engagement with the disks to cause them to rotate with the motor-shafts, substantially as shown and described.

In witness whereof, we have hereunto set our hands in presence of two subscribing witnesses.

ARTHUR L. McKINNEY.
LYMAN H. ZEIGLER.

Witnesses:
R. J. SUTTON,
AMELIA BROHEZ.

---

Copies of this patent may be obtained for five cents each, by addressing the "Commissioner of Patents, Washington, D. C."